(12) United States Patent
Ree

(10) Patent No.: US 10,542,497 B2
(45) Date of Patent: *Jan. 21, 2020

(54) LOW POWER SENSOR NETWORK

(71) Applicant: AT&T Intellectual Property I, L.P., Atlanta, GA (US)

(72) Inventor: Bradley Richard Ree, Cumming, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 139 days.

This patent is subject to a terminal disclaimer.

(21) Appl. No.: 15/705,354

(22) Filed: Sep. 15, 2017

(65) Prior Publication Data

US 2018/0007636 A1 Jan. 4, 2018

Related U.S. Application Data

(63) Continuation of application No. 14/048,887, filed on Oct. 8, 2013, now Pat. No. 9,801,137.

(51) Int. Cl.
*H04W 52/02* (2009.01)
*G01D 4/00* (2006.01)

(52) U.S. Cl.
CPC ... *H04W 52/0296* (2013.01); *H04W 52/0219* (2013.01); *H04W 52/0229* (2013.01); *G01D 4/004* (2013.01); *Y02B 90/242* (2013.01); *Y02D 70/00* (2018.01)

(58) Field of Classification Search
None
See application file for complete search history.

(56) References Cited

U.S. PATENT DOCUMENTS

| | | | |
|---|---|---|---|
| 5,438,329 A | 8/1995 | Gastouniotis et al. | |
| 6,463,307 B1 | 10/2002 | Larsson et al. | |
| 6,771,659 B1 * | 8/2004 | Parantainen | H04L 1/1685 370/466 |
| 7,421,291 B2 | 9/2008 | Karaoguz et al. | |
| 7,447,526 B2 | 11/2008 | Kim et al. | |

(Continued)

OTHER PUBLICATIONS

Non-Final Office Action from U.S. Appl. No. 14/048,887, dated Apr. 10, 2015, 37 pages.

(Continued)

*Primary Examiner* — Yaotang Wang
(74) *Attorney, Agent, or Firm* — Amin, Turocy & Watson, LLP

(57) ABSTRACT

Device power consumption is reduced by operating using both one-way and two-way communication techniques. In an aspect a device operates in a first mode enabling one-way communication to an other device for a first portion of device operation time. The first mode includes transmitting a first set of messages to the other device while turning off a power supply used by a receiver of the device. The device switches between operating in the first mode and the second mode. The second mode enables two-way communication between the device and the other device for a second portion of device operation time less than the first portion of device operation. The second mode includes transmitting a second message to the other device, and in response to the transmitting the second message, turning on the power supply used by the receiver.

20 Claims, 11 Drawing Sheets

(56) References Cited

U.S. PATENT DOCUMENTS

| | | |
|---|---|---|
| 7,512,418 B2 | 3/2009 | Ara et al. |
| 7,647,078 B2 | 1/2010 | Kim et al. |
| 7,664,537 B2 | 2/2010 | Albulet et al. |
| 8,023,443 B2 | 9/2011 | Zakrzewski |
| 8,405,505 B2 | 3/2013 | Desai et al. |
| 8,417,222 B1 | 4/2013 | Nerieri et al. |
| 2002/0167417 A1 | 11/2002 | Welles, II et al. |
| 2007/0019771 A1 | 1/2007 | Ambuechl et al. |
| 2007/0260236 A1 | 11/2007 | Han et al. |
| 2008/0279560 A1 | 11/2008 | Osawa et al. |
| 2008/0305839 A1 | 12/2008 | Karaoguz et al. |
| 2009/0102681 A1* | 4/2009 | Brennan, Jr. .......... G01D 4/004 340/870.03 |
| 2009/0225811 A1* | 9/2009 | Albert ............... H04W 52/0235 375/132 |
| 2009/0262661 A1 | 10/2009 | Ueda et al. |
| 2010/0007521 A1* | 1/2010 | Cornwall ................ H04Q 9/00 340/870.02 |
| 2010/0176967 A1 | 7/2010 | Cumeralto et al. |
| 2010/0315203 A1 | 12/2010 | Peden, II et al. |
| 2010/0315986 A1 | 12/2010 | Lee et al. |
| 2012/0063397 A1 | 3/2012 | Abedi et al. |
| 2012/0275366 A1 | 11/2012 | Anderson et al. |
| 2012/0280830 A1 | 11/2012 | Heath |
| 2013/0250825 A1* | 9/2013 | Gosal ............... H04W 52/0232 370/311 |

OTHER PUBLICATIONS

Final Office Action from U.S. Appl. No. 14/048,887, dated Oct. 8, 2015, 38 pages.
Non-Final Office Action from U.S. Appl. No. 14/048,887, dated Aug. 25, 2016, 52 pages.
Final Office Action from U.S. Appl. No. 14/048,887, dated Feb. 27, 2017, 75 pages.
Zhu et al., "Analysis of power consumption for different sensor access modes" Proceedings of the 2007 IEEE International Conference on Networking, Sensing and Control, London, UK, Apr. 15-17, 2007, pp. 329-333.

* cited by examiner

LOW POWER SENSOR NETWORK

RELATED APPLICATION

The subject application is a continuation of, and claims priority to, U.S. patent application Ser. No. 14/048,887 (now U.S. Pat. No. 9,801,137), filed Oct. 8, 2013, and entitled "LOW POWER SENSOR NETWORK", the entirety of which application is hereby incorporated by reference herein.

TECHNICAL FIELD

This disclosure relates generally to increasing battery life associated with devices employed in a wireless sensor network.

BACKGROUND

Wireless sensor networks deployed at locations without power outlets are usually powered by batteries. In order to integrate highly responsive wireless sensor devices within the wireless sensor network, the wireless sensor devices are configured to operate with receivers in an "always on" state. However, high power consumption as a result of continuous receiver activation can result in rapid battery depletion. Accordingly, a downside to having highly responsive wireless sensor devices is the need for integration of large batteries within the devices and/or constant changing of batteries.

The above-described background information relating to conventional sensor networks is merely intended to provide a general overview. Other background information may become further apparent upon review of the following detailed description.

DETAILED DESCRIPTION

Figure 1:
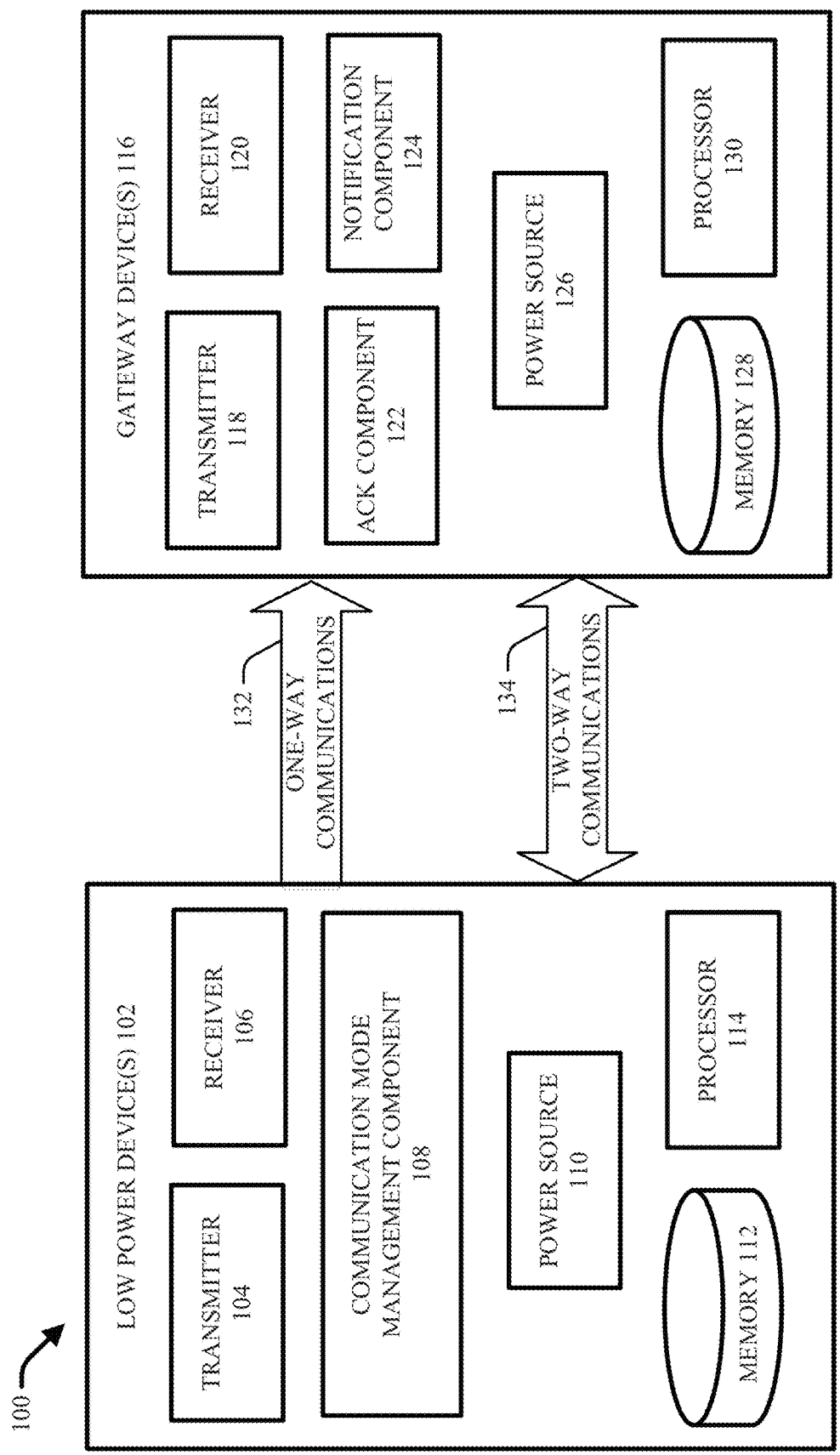
FIG. 1 illustrates a block diagram of an example system for increasing battery life associated with devices employed in a wireless sensor network in accordance with various aspects and embodiments described herein.

The various embodiments are described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details. In other instances, well-known structures and components are shown in block diagram form in order to facilitate describing the various embodiments.

By way of introduction, the subject matter described in this disclosure generally relates to increasing battery life associated with devices included in a local sensor network, such as a home security system or health monitoring system. In an aspect, a local sensor network includes a plurality of battery operated devices configured to wirelessly communicate with a gateway device using radio frequency communications. In order to reduce battery consumption, the respective devices can employ communication modes that reduce power consumption based in part on receiver activation time. In particular, the devices can be programmed to transmit events and heartbeats without the need of an acknowledgment message (ACK) from the gateway device for a majority of operation time. Such transmissions that do not require an ACK are referred to herein as one-way communications or one-way messages. When the devices employ one-way communications the devices can deactivate their receivers because there isn't a need to be in a receive state for receiving an ACK.

However, for a relatively small portion of operation time, the devices can be programmed to transmit an event or heartbeat and activate their receivers to receive an ACK. Such transmissions that require receiver activation are referred to herein as two-way communications or two-way messages. This ACK can inform the devices of pending messages from the gateway to the device. The devices can remain in a receive state long enough to receive the pending messages. Upon receipt of the pending messages, the devices can deactivate their receivers. This method of communications greatly reduces power consumption, and thus allows for smaller batteries or less frequent changing of batteries. This method of communication further allows for configuration changes, software updates, and other two-way communications between the devices and the gateway device while reducing battery consumption associated with receiver activation required for enabling the two-way communications.

In an aspect, a device is provided that includes a memory to store executable instructions and a processor, coupled to the memory, that facilitates execution of the executable instructions to perform various operations. The operations can include operating in a first mode enabling one-way communication to another device for a first portion of device operation time using a first amount of power from a power source configured to provide power to the device and switching to operating in a second mode enabling two-way communication between the device and the other device for a second portion of device operation time using a second amount of power from the power source, the operating in the second mode comprising, wherein the first portion of device operation time is greater than the second portion of device operation time and the first amount of power is less than the second amount of power. The operating in the first mode includes operations for transmitting a first set of messages to the other device, and turning off a power supply used by a receiver of the device. The operating in the second mode includes operations for transmitting a second message to the other device, and in response to the transmitting the second message, turning on the power supply used by the receiver.

In another aspect, a method is presented that includes operating, by a device using a processor, in a first communication mode using a first amount of power from a power source configured to provide power to the device, comprising. The first communication mode includes activating a receiver of the device based on a duty cycle, receiving a signal from another device in response to the activating the receiver, deactivating the receiver in response to determining the signal does not comprise information identifying the device, maintaining activation of the receiver in response to determining the signal comprises the information identifying the device, receiving another signal comprising information associated with the device from the other device in response to the maintaining the activation of the receiver, and deactivating the receiver in response to the receiving the other signal from the other device.

Further provided is a tangible or non-transitory computer-readable medium or a computer readable storage device comprising computer-readable instructions that, in response to execution, cause a computing system to perform various operations. These operations can include, in response to being in a first mode enabling one-way communication to another device for a first portion of device operation time using a first amount of power from a power source configured to provide power to the device, transmitting a first set of messages to the other device, and turning off a power supply used by a receiver of the device. These operations further include, in response to being in a second mode enabling two-way communication between the device and the other device for a second portion of device operation time using a second amount of power from the power source, transmitting a second message to the other device, and in response to the transmitting the second message, turning on the power supply used by the receiver, wherein the first percentage of device operation time is greater than the second percentage of device operation time and the first amount of power is less than the second amount of power.

Referring now to the drawings, with reference initially to FIG. 1, presented is a diagram of an example system 100 for increasing battery life associated with devices employed in a wireless sensor network in accordance with various aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 includes one or more low power devices 102 and one or more gateway devices 116. Low power devices 102 are referred to herein as low power devices merely to indicate that the devices are designed to consume less power than similar devices that do not employ the various energy management techniques disclosed herein. In an aspect, low power device 102 is a sensor device configured to operate in a low power sensor network. However, low power device 102 can include virtually any device configured to wirelessly transmit and receive information using energy received from an exhaustible power supply employed by the device (e.g., a battery).

For example, low power device 102 can include a device associated with a home automation network (e.g., a smart home) including but not limited to: a sensor device (e.g., a motion sensor, a temperature sensor, a light sensor, a heat sensor, an acoustic sensor, an infrared sensor, etc.), a device with an interactive interface (e.g., a thermostat, or a security system control panel), an alarm device, a detection device (e.g., smoke detector) or an automated control device (e.g., a garage door opener, an automated door lock, an automated blind control device, an automated sprinkler system control device, an automated thermostat control device, an automated sound system device, an automated light controlling device, etc.). In another example, low power device 102 can include a device associated with a home or office security system (e.g., a sensor device or an alarm device), a health monitoring system or an energy management system. Still in yet another example, low power device 102 can include an implantable medical device (IMD).

Low power device 102 includes a transmitter 104 for transmitting information to another device (e.g., gateway device 116) and a receiver for receiving information from another device (e.g., gateway device 116). In an aspect, transmitter 104 is a radio transmitter configured to transmit information using radio frequency (RF) waves and receiver 106 is a radio receiver configured to receive information embodied within radio frequency waves.

Low power device 102 includes communication mode management component 108 to control communication of information and power consumption associated with communication of the information, using transmitter 104 and receiver 106. Low power device 102 also includes power source 110, memory 112 for storing computer executable components and instructions and processor 114 to facilitate operation of the instructions (e.g., computer executable components and instructions) by the low power device 102. Power source 110 can include any suitable power source that can provide power for the operation of the various components of low power device 102. For example, power source 110 can include but is not limited to a battery or batteries, a capacitor, a solar power source, or a mechanically derived power source (e.g., MEMs system) or an RF power source such as an RF power amplifier.

Low power device 102 is configured to communicate information using both one-way 132 and two-way 134 communication schemes. As noted above, a one-way communication scheme includes transmission of information that does not involve a response (e.g., an ACK) from the device receiving the information confirming receipt of the information. On the contrary, one-way communication schemes involve the transmission of information to another device (e.g., gateway device 116) without utilization or activation of a receiver. In an aspect, one-way communication schemes involve repetitive sending of a message (e.g., three times, five times, etc.) to increase confidence that the message will be received (e.g., by gateway device 116) despite the lack of assurance of an ACK. According to this aspect, the transmitter 104 can sleep or be deactivated in between transmissions to reduce power consumption by the transmitter 104.

One-way communications benefit from the reduction or elimination of power consumption associated with receiver activation during the period between transmission of information and the time of receipt of an ACK from the receiving device. As a result, when low power device 102 employs a one-way communication scheme, low power device 102 can benefit from a reduction in power consumption by providing low or no power from power source 110 to the receiver 106. However, one-way communication schemes do not allow for remote reconfiguration of low power device 102, software upgrades, or requests for information from a remote device (e.g., gateway device 116).

Two-way communication schemes involve receiver 106 activation such that low power device 102 can both send and receive information to and from another device (e.g., gateway device 116), respectively. In an aspect, the information received is merely an ACK indicating receipt of information transmitted by low power device 102 to another device (e.g., gateway device 116). According to this aspect, in response to transmission of information by low power device 102, low power device 102 can activate (e.g., provide power to) the receiver and wait for the ACK. Low power device 102 can deactivate the receiver (e.g., reduces or stop power supply to the receiver) upon receipt of the ACK. By employing a two-way communication scheme that involves receiving an ACK, low power device 102 can ensure successful receipt of information by the receiving device (e.g., gateway device 116).

Two-way communication schemes also allow a remote device (e.g., gateway device 116) to send other information to low power device 102 and/or request information from low power device 102. For example, two-way communication schemes can allow a remote device (e.g., gateway device 116) to send reconfiguration information to low power device 102 to effectuate remote configuration of low power device 102. In another example, two-way communication schemes can allow a remote device (e.g., gateway device 116) to send updates to low power device 102. In another example, two-way communication schemes can allow a remote device read information from low power device, (e.g., device identification information, operational statistics, battery level, etc.). However, two-way communication schemes suffer from more power consumption compared to one-way communication schemes as a result of receiver activation required for the two-way communication schemes.

Low power device 102 is configured to employ both one-way and two-way communication schemes to capitalize on the benefits associated with the respective schemes while reducing the drawbacks associated with the respective schemes. When operating using a one-way communication scheme, low power device 102 will consume less power from power source 110 with respect to an amount of power consumed when operating using two-way communication scheme.

In an aspect, low power device 102 can be configured to operate using a one-way communication scheme a majority of its operation time and a two-way communication scheme for a relatively small percentage of its operation time. For example, low power device 102 can be configured to operate using a one-way communication scheme about 75% of its operation time and a two-way communication scheme about 25% of its operation time. In another example, low power device 102 can be configured to operate using a one-way communication scheme about 80% of its operation time and a two-way communication scheme about 20% of its operation time. In another example, low power device 102 can be configured to operate using a one-way communication scheme about 90% of its operation time and a two-way communication scheme about 10% of its operation time. In yet another example, low power device 102 can be configured to operate using a one-way communication scheme about 95% of its operation time and a two-way communication scheme about 5% of its operation time.

For example, a variety of predominately passive low power devices 102, such as sensor devices (e.g., motion sensors, light sensors), can use one-way communications to report non-critical information and/or send periodic status reports throughout the day to gateway device 116. Once a day however these devices can employ two-way communications to send more critical information and ensure reception of the critical information via an ACK. The two-way communications can also facilitate receiving configuration information or updates. This method of communications greatly reduces power consumption, and thus allows for smaller batteries and/or less frequent changing of batteries.

For example, in accordance with a one-way communication scheme, low power device 102 can transmit a message to gateway device 116 five consecutive times to ensure receipt of the message by gateway device 116 (e.g., under the assumption that at least one of the five messages will be received by the gateway device 116 without validation of an ACK). Each time low power device 102 sends the message, the transmitter 104 can be activated for 20.0 milliseconds (ms) to effectuate transmission of the message. The transmitter 104 can sleep or be deactivated in between transmissions. In an aspect, the transmitter sleeps for a period of 1.0 second in between each repetitive transmission. Accordingly, to effectuate successful communication of a message using a one-way communication scheme, transmitter 104 will send the message five consecutive times, where each transmission is associated with a 20.0 ms activation time and a 1.0 second sleep period. The transmitter will thus draw power for a total of 100.0 ms, resulting in a total device wake time of 100.0 ms to complete successful communication of the message. Yet, in accordance with a two-way communication scheme, low power device 102 can send a single message associated with a 20.0 ms transmitter activation time and wait for receipt of an ACK for about 1.0 seconds. During the 1.0 second period in which the low power device waits for the ACK, the receiver 106 will be activated. Accordingly, to effectuate successful communication of a message using a two-way communication scheme, transmitter 104 will be activated a for 20.0 ms and receiver 106 will be activated for 1.0 second, resulting in a total device wake time of 1200 ms (as opposed to 100 ms for one-way communications). As a result, when low power device 102 employs a one-way communication scheme a majority of its operation time (e.g., about 90%), low power device 102 can achieve significant reduction in power consumption. The typical power consumption would be 90% of a two-way communication scheme. However, a large network with a plurality of low power devices can result in a total system savings of about 200%.

In an aspect, low power device 102 can be configured to employ a two-way communication or a one-way communication scheme based on a type of information needing to be transmitted by the low power device. According to this aspect, communication mode management component 108 can determine which communication scheme to employ based on the type of information to be transmitted. For example, low power device 102 can be configured to employ a two-way communication scheme to receive an ACK when transmitting a certain type of information considered more critical or valuable by low power device 102 than a type of information transmitted using a one-way communication scheme. For example, an IMD that monitors blood pressure can be configured to transmit status updates indicating a stable blood pressure using one-way communications. However, the IMD can be configured to transmit information indicating a severe increase or decrease in blood pressure using two-way communications.

In another, aspect, low power device 102 can be configured to operate using a both one-way communication scheme and a two-way communication scheme while reducing an amount of time (and associated amount of power source 110 drain) the receiver 106 is activated in association with the two-way communication scheme. This technique is beneficial for certain low power devices that may need to be more responsive than a mere passive sensor device (e.g., an alarm device that needs to be synchronized with other alarm devices, a thermostat, an automated door lock, etc.).

According to this aspect, gateway device 116 can periodically emit signals or beacons that can include information pertaining to one or more low power devices 102 include in a local network. The signal can include information identifying devices in the local network for which the gateway device has a pending message for and/or needs to communicate with. The low power devices 102 can initiate a two-way communication scheme on a periodic basis to listen (e.g., via activation of receiver 106) for a beacon or signal emitted from gateway device 116. Upon receipt of the signal/beacon by one of the low power devices 102, the low power device can analyze the signal/beacon to determine whether the low power device is identified in the signal/beacon. If the signal/beacon does not identify the low power device, the low power device can deactivate its receiver 106. If however the signal/beacon does identify the low power device, the low power device can communicate with the gateway device 116 and receive pending message (or other information) from the gateway device 116 using two-way communications. Upon receipt of the pending message (or other information from the gateway device 116), the low power device 102 can deactivate its receiver.

According to this aspect, the low power device 102 is appearing to be highly responsive yet do not have its receiver 106 activated all of the time, thus conserving power. On the contrary, the low power device 102 can activate its receiver on a periodic basis (e.g., a duty cycle of about 200 ms during a period of 60 seconds, or 0.33%) for a short period of time to listen for a beacon from the gateway device 116. The low power device 102 does not spend additional time activating its receiver unless the gateway device 116 needs to communicate with the low power device as determined by information included in the beacon.

Communication mode management component 108 is configured to control how and when low power device 102 uses a one-way communication scheme and a two-way communication scheme and protocols associated with operation of a particular one-way communication scheme or two-way communication scheme. In an aspect, low power device 102 can be configured to operate using two or more different communication modes where at least one of the communication modes involves a one-way communication scheme and at least another communication mode involves a two-way communication scheme. The communication modes can be stored in memory 112 and define protocols associated with implementation of the respective communication modes.

For example, a communication mode can define a one-way communication scheme to be employed by low power device 102, including the type of information to be transmitted using one-way messages, a duty cycle associated with transmitter activation during the one-way communication scheme, frequency of repeat message communication using the one-way communication scheme, timing of message communication using the one-way communication scheme, power usage associated with the one-way communication scheme, and listen before talk (LBT) requirements and protocols associated with the one-way communication scheme. In an another example, a communication mode can define a two-way communication scheme to be employed by low power device 102, including the type of information to be transmitted using two-way messages, duty cycles associated with transmitter and receiver activation during the two-way communication scheme, frequency of repeat message communication using the two-way communication scheme, timing of message communication using the two-way communication scheme, and power usage associated with the two-way communication scheme.

According to these examples, memory 112 can define various communication modes (e.g., at least two including a one-way communication mode and a two-way communication mode) that can be employed by low power device 102 as controlled by communication mode management component 108. For example, a first communication mode can define a one way scheme with a transmitter duty cycle X. Another communication mode can define a one-way communication scheme with a transmitter duty cycle Y. A third communication mode can define a two-way communication scheme that involves a receiver duty cycle of Z associated with listening for an ACK. A fourth communication mode can define a two-way communication scheme that involves periodic listening for a beacon transmitted by gateway device 116 and receiver activation/deactivation based on information included in the beacon. It should be appreciated that a variety of different communication modes involving either one-way or two-way communication scheme can be employed by low power device 102 and the above examples are not intended to limit the scope of the disclosure.

Communication mode management component 108 is configured to implement communication modes associated with low power device 102. In an aspect, communication mode management component 108 can implement respective communication modes in accordance with programming information defined in memory 112 that influences when to apply a particular communication mode. In an aspect, the protocols/algorithms can define what communication modes to apply and when to them (e.g., at least two different communication modes involving one-way and two-way communication schemes respectively) based on a predetermined time schedule. For example, low power device 102 can be programmed to operate using communication mode A from hours 9 am to 12 pm, communication mode B from hours 12 pm to 12:15 pm, and communication mode C from hours 12:15 pm to 9 am.

In another aspect, the protocols/algorithms can reflect various other conditional factors that can influence when communication mode management component 108 should apply a particular communication mode. These conditional factors can include but are not limited to, type of information to be transmitted, a remaining power level of power source 110, occurrence of a trigger or event, and transmission channel traffic. For example, LPD can be configured to operate using communication mode A to transmit stable status update information sensed by LPD and communication mode B to transmit a significant change in status of information sensed by the LPD. According to this aspect, communication mode management component 108 can determine or infer which communication mode to apply based on these various factors conditional factors.

Gateway device 116 is configured to wirelessly communicate with one or more low power devices 102. Gateway device 116 includes a transmitter 118 for transmitting information to another device (e.g., one or more low power device 102) and a receiver 120 for receiving information from another device (e.g., one or more low power devices). In an aspect, transmitter 118 is a radio transmitter configured to transmit information using radio frequency (RF) waves and receiver 120 is a radio receiver configured to receive information embodied within radio frequency waves. Gateway device 116 also includes power source 126, memory 128 for storing computer executable components and instructions and processor 130 to facilitate operation of the instructions (e.g., computer executable components and instructions) by the gateway device 116.

Gateway device 116 can include ACK component 122 to transmit an ACK to another device in response to receiving information from the device. In an aspect, ACK component 122 can analyze a received message to determine whether the message includes information indicating that an ACK is requested. For example, low power device 102 can send a message to gateway device with information indicating the low power device 102 is operating in a two-way communication mode and/or requests an ACK. In response to a determination that an ACK is requested, the ACK component 122 can configure and send the ACK.

In an aspect, in addition to merely sending an ACK in response to a request for an ACK and/or receipt of a message that low power device 102 is operating in a two-way communication mode, ACK component 122 can send information to the low power device 102 with an ACK indicating that gateway device 116 has information for the low power device 102 and/or would like to further communicate with the low power device. According to this aspect, ACK component 122 can send a response to the low power device with additional information for the low power device. The ACK component 122 can also send a response to the low power device 102 indicating a period of time the gateway device 116 requests the low power device 102 to leave its receiver on. In response to receiving such a message from the gateway device 116, the low power device 102 can leave its receiver on for the requested period of time to allow the gateway device 116 to communicate with the low power device 102.

Gateway device 400 can also include notification component 124 to configure and send notifications (e.g., beacons) to one or more low power devices 102 included in a local network. The notifications can include information defining which of the low power devices included in the local network the gateway device 116 has a pending message for and/or desires to communicate with. In an aspect, notification component 124 is configured to send out notification signals on a periodic basis to (e.g., once every minute). Notification component 124 can also receive response signals from low power devices 102 identified in a notification indicating that the respective low power devices have become aware of their inclusion in a notification. In response to receipt of a response signal from a low power device, notification component 124 can initiate additional communication with the low power device (e.g., to send the pending message to the low power device or otherwise communicate with the low power device).

Figure 2:
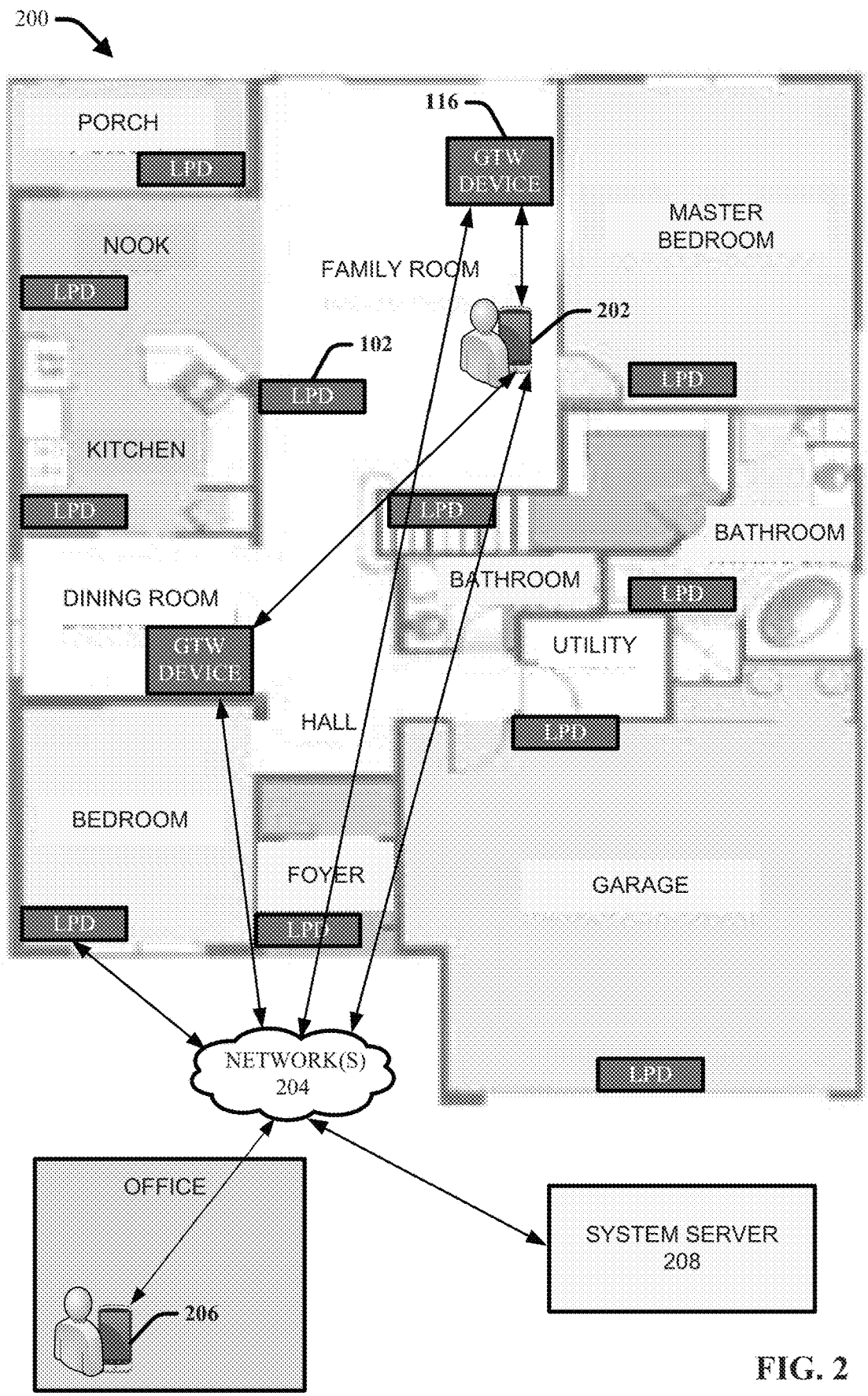
FIG. 2 illustrates architecture of an example system for increasing battery life associated with devices employed in a wireless sensor network in accordance with various aspects and embodiments described herein.

FIG. 2 presents an example implementation of a low power sensor network system 200 in accordance with aspects embodiments described herein. System 200 can include same or similar features and functionalities as system 100. Repetitive description of like elements employed in respective embodiments of systems and devices described herein are omitted for sake of brevity.

System 200 demonstrates a local device network that can make up a home security system, home automation system, or the like using the various devices and associated energy management techniques disclosed herein. System 200 includes a plurality of low power devices (LPD) 102 dispersed throughout a home. The LPDs can vary depending on the type of network they are associated with. For example, where system 200 is associated with a home security system, the LPDs 102 can include sensor devices (e.g., motion sensors, door opening detection sensors, window opening sensors, heat sensors, IR sensor, etc.), alarm devices, or other types of electronic devices integrated within the home security network.

System 200 includes one or more gateway devices 116 configured to communicate with the plurality of LPDs 102. For example, the gateway device(s) can receive and process information transmitted thereto by the respective LPDs, report information received from LPDs 102 (e.g., initiate communication with remote emergency services), read information from respective LPDs and provide configuration information to the LPDs. In an aspect, network 200 includes a single gateway device configured to communicate with the LPDs 102. In other aspects, network 200 can include a plurality of gateway devices 204. In aspect, a portable handheld device 202 (e.g., a phone, a smartphone, a tablet personal computer (PC), etc.) can serve as a gateway device and include the various features and functionalities as a gateway device 116.

In an aspect, gateway device(s) 116 are configured to communicate with LPDs 102 using relatively short range RF communications (e.g., spanning within a home environment, office environment, communications extending to up to 850 meters, etc.). According to this aspect, gateway device(s) 116 and LPDs 102 establish a local network. In another aspect, gateway devices 116 can be configured to communicate with external devices or systems via one or more additional networks 204. For example, network(s) 204 can include but are not limited to a cellular network, a wide area network (WAD) (e.g., the Internet), or a local area network (LAN). According to this aspect, a system server 208 can remotely communicate with gateway devices 116 (and vice versa) via a network 204. Similarly, a user can remotely communicate with his home security system using a remote device 206 at his office (e.g., a smartphone, a tablet PC, a desktop PC, etc.) via a network 204. For example, a user can employ remote device 206 to initiate reconfiguration of an LPD 102. According to this example, the user can communicate directly with a gateway device 116 via a network 204 to effectuate the reconfiguration. The user could also employ a system server to effectuate reconfiguration. For example, the user can communicate a request to reconfigure one or more LPDs to system server 208 via a network 204. In turn the system server 208 can process the request and communicate with a gateway device 116 to effectuate the reconfiguration. Still in some aspects, communication can be established directly (e.g., without using a gateway device as an intermediary) between an LPD 102 and a remote device (e.g., remote device 206 or system server 208) via a network 204.

Figure 3:
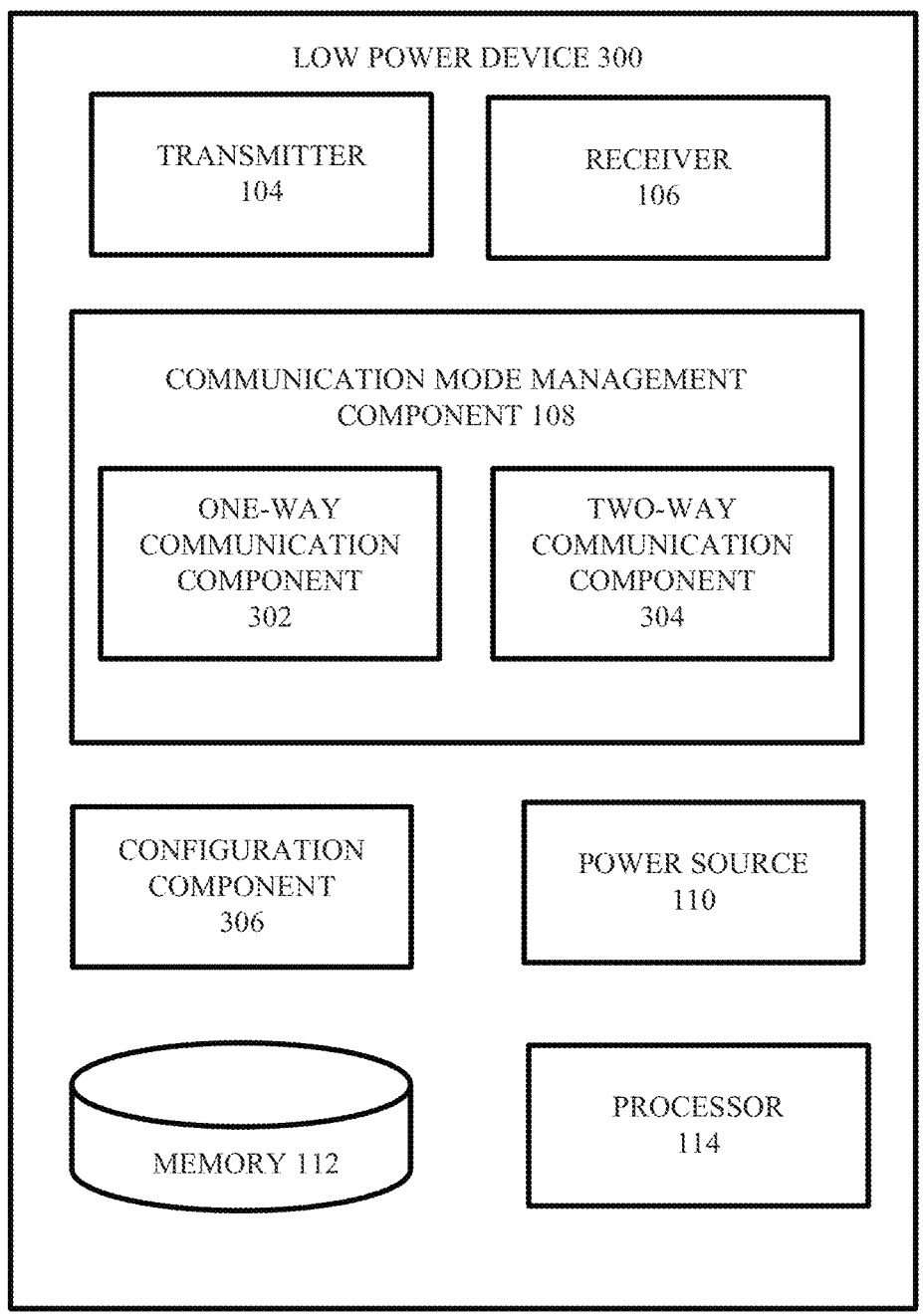
FIG. 3 presents an example low power sensor device that can be employed in association with a low power sensor network in accordance with various aspects and embodiments described herein.

With reference to FIG. 3 presented is another example a low power device (LPD) 300 in accordance with aspects embodiments described herein. LPD 300 includes same or similar features and functionalities as LPD 102. Repetitive description of like elements employed in respective embodiments of systems and devices described herein are omitted for sake of brevity.

As discussed supra, LPDs described herein can include communication mode management component 108 to implement communication modes associated with low power device 102. In particular, communication mode management component 108 can determine or infer, based in part on programming information stored in memory, what communication mode to apply and when to apply the communication mode. Communication mode management component 108 can further direct operation of LPD 300 using an applicable communication mode.

LPD 300 is configured to operate using at least two different communication modes, wherein at least one of the communication modes involves a one-way communication scheme and another one of the communication modes involves a two-way communication scheme. Communication mode management component 108 can include a one-way communication component 302 to effectuate implementation of a one-way communication mode and a two-way communication component 304 to effectuate implementation of a two-way communication mode.

In an aspect, LPD 300 can include configuration component 306 to facilitate configuring the communication modes of LPD 300. According to this aspect, LPD 300 can operate in a configuration mode in which transmitter 104 and receiver 106 are activated and configuration information is communicated between LPD 300 and another device (e.g., gateway device 116). The configuration information can include information defining a one-way communication mode to be employed by LPD 300 and respective protocols associated with implementation of the one-way communication mode, and a two-way communication mode to be employed by LPD 300 and respective protocols associated with implementation of the two-way communication mode. For example, during configuration mode, LPD 300 can present information about the device to a gateway device (e.g., serial number, authorization information, etc.). The gateway device can then transfer network credentials and operating mode configuration information to the LPD. The operating mode configuration information can define protocols associated with implementation of a one-way communication mode and a two communication mode (e.g., duration between one-way heartbeats, duration between two-way heartbeats, what type of events shall be transmitted in one-way mode, what type of events shall be transmitted in two-way, etc.).

In a first embodiment, LBD 300 is configured to operate in a low responsive state using a first one-way communication mode a majority of operation time (e.g., about 90%) and a second two-way communication mode the remainder of operation time (e.g., about 10%, one a day, etc.). LPD 300 will consume a significantly lower amount of power when operating in the first mode as compared to the second mode based in part on receiver activation during the second mode which is not required during the first mode. According to this aspect, the first and second modes associated with the low responsive state can be defined in memory 112. One-way communication component 302 can control operation of LPD 300 using the first mode based on instructions defined in memory 112 that indicate how and when to apply the one-way mode (e.g., based on at least one of: time, type of information to be transmitted, or power level of the LPD). Two-way communication component 304 can control operation of LPD 300 using the second mode based on instructions defined in memory that indicate how and when to apply the two-way mode (e.g., based on at least one of: time, type of information to be transmitted, or power level of the LPD).

According to this embodiment the first one-way communication mode involves a one-way communication scheme in which transmitter 104 will transmit messages (e.g., heartbeats or event) while receiver 106 is deactivated. The receiver 106 will remain deactivated (e.g., via provision of low or no power to the receiver) during the entire operation of the one-way mode. With the one-way mode, a single message or heartbeat is transmitted a plurality of times (e.g., about five to eight times) to increase confidence that it will be received. In between each repeat transmission of the message, the transmitter 104 will sleep (e.g., via provision of low or no power to the transmitter). It should be appreciated that the type of information to be transmitted using the one-way mode, the number of times a message is to be repeatedly transmitted, the duration of time between transmissions, and an amount of power to be consumed for transmissions, can vary based on the type of LPD and configuration information provided in memory 112.

In an aspect, messages transmitted using the one-way mode can include information indicating that LPD 300 is operating in one-way mode. This information can inform the receiving device that the LPD's receiver is deactivated and inform the receiving device that an ACK is not required. In an aspect, the information indicating the LPD is in one-way mode can be gleaned from the frequency used by the transmitter to transmit messages in one-way mode. For example, one-way communication component can instruct the transmitter 104 to transmit one-way messages using a particular frequency that distinguishes the messages as one-way messages.

In another aspect, the one-way mode can include a listen before talk (or listen before transmit) (LBT) mechanism before transmission of a message to reduce collisions associated with a local device network in which LPD 300 is employed. For example, as the number of LPDs employed in a local network increases, the number of one-way transmissions and thus collisions over the various channels employed by the devices will increase. Thus in an aspect, before transmission of a one-way message, LPD 300 can employ an LBT mechanism. LBT is a technique used in radio communications whereby a radio transmitter (e.g., transmitter 104) first senses its radio environment before it starts a transmission. LBT can be used by transmitter 104 to find a free radio channel to operate on or to wait to initiate transmission of a one-way event based in part on a level of traffic associated with the local network.

The second two-way communication mode involves a two-way communication scheme whereby transmitter 104 will transmit messages (e.g., heartbeats or event) and receiver 106 is activated. For example, after initiation or completion of transmission of a two-way message, the LPD will go into a receive state via activation of its receiver 106 and wait for an ACK. In an aspect, the maximum time between transmission of a two-way message and receipt of an ACK is about 1.0 second. If an ACK is not received after a predetermined period Y (where Y is an amount of time, such as 1.0 second) after transmission of a two-way message, the two-way message is resent and the cycle is repeated. In an aspect, the cycle of transmission of a two-way message is repeated until an ACK is received. In another aspect, the cycle of transmission of a two-way message shall not exceed M times (where M is an integer).

In an aspect, in response to receiving the ACK, the LPD can deactivate its receiver. In another aspect, the ACK can include information informing the LPD to leave its receiver activated. For example the ACK can include information informing the LPD that the receiving device has a pending message or messages for the LPD. Based on this information, the LPD can leave its receiver on until the pending message or messages are received. In another example, the ACK can include information informing the LPD to leave its receiver on for a predetermined amount of time so that the receiving device can further communicate with the LPD (e.g., to send updated configuration information, to push new firmware to the LPD, to change operating mode of the LPD, to modify sensor sensitivity of the LPD where the LPD is a sensor device, to read information from the LPD, etc.). Based on this information, the LPD can leave its receiver on until the predetermined amount of time has elapsed.

In an aspect, messages transmitted using the two-way mode can include information indicating that LPD 300 is operating in two-way mode. This information can inform the receiving device that the LPD's receiver is activated and inform the receiving device that an ACK is required. In an aspect, the information indicating the LPD is in two-way mode can be gleaned from the frequency used by the transmitter to transmit messages in the two-way mode. For example, two-way communication component can instruct the transmitter 104 to transmit two-way messages using a particular frequency that distinguishes the messages as two-way messages.

In a second embodiment, LBD 300 is configured to operate in a high responsive state using a conditional two-way communication mode at least a portion of operation time. Two-way communication component 304 can control operation of LPD 300 using the conditional two-way communication mode based on instructions defined in memory that indicate how and when to apply the two-way conditional mode (e.g., based on at least one of: time, type of information to be transmitted, or power level of the LPD).

The conditional two-way mode involves periodic activation of receiver 106 to poll for a signal or beacon from a gateway device (e.g., gateway device 116). In particular, LPD 300 can periodically activate its receiver 106 to listen for a beacon emitted by the gateway device. For example, LPD 300 can activate its receiver (e.g., wake up) every X seconds, where X is a number. In an aspect, LPD 300 is configured to activate its receiver as a function of a desired response time. For example, LPD 300 can activate its receiver every 1-3 seconds if response time for the device is critical (e.g., where LPD is a siren that indicates a break in). In another example, LPD 300 can activate its receiver every 30 seconds if response time for the device is less critical (e.g., where LPD is a door lock). The gateway device 116 can be configured to periodically emit the beacon. In an aspect, the gateway device emits the beacon every X milliseconds, where X is a number. For example, the gateway device 116 can emit the beacon every 400 ms.

In response to identifying the beacon, the LPD can analyze the beacon to determine whether the beacon identifies the LPD. For example, the beacon can include an identifier for the LPD which can inform the LPD that the gateway device has a pending message or messages for the LPD. In response to a determination that the LPD is not identified in the beacon, the LPD deactivate its receiver.

However, in response to a determination that the LPD is identified in the beacon, the LPD can communicate with the gateway device to receive the pending message or messages. For example, the LPD can leave its receiver on long enough to perform a two-way heartbeat with the gateway device to receive the pending message or messages. In an aspect, in response to identifying itself in the beacon, the LPD can send a message to the gateway device informing the gateway device that its receiver is activated and that it is ready for receiving the pending message or messages. In turn, the gateway device can send the pending message or messages to the LPD (e.g., in synchronization with sending messages to other LPDs on the local network to effectuate a synchronized response by the LPDs, such as a synchronized alarm sounding where the LPDs are alarms). After the pending message or messages are received, the LPD can deactivate its receiver.

In another aspect, in response to identifying itself in the beacon, the LPD can send a confirmation message to the gateway device informing the gateway device that it has received the beacon and has become aware that it was identified in the beacon. This way the gateway device can confirm that the LPD did in fact receive and interpret the beacon correctly. In association with sending the confirmation message, the LPD can activate its receiver. In response to receipt of the confirmation message by the gateway device, the gateway device can send an acknowledgment message (e.g., an ACK) to the LPD. The ACK can include information instructing the LPD to leave its receiver activated for a window of time allotted by the gateway device. During the window of time, the gateway device can then send any pending messages it has for the LPD to the LPD. The LPD can further deactivate its receiver after the window of time has elapsed and/or the pending messages are received.

According to this embodiment, the LPD can operate in the high responsive state using the subject conditional two-way communication mode at least a portion of operation time. In an aspect, the LPD can operate in the high responsive state using the conditional two-way communication mode approximately 90-100% of its operation time. In another aspect, the LPD can operate in the high responsive state using the subject conditional two-way communication mode as well as the first one-way communication mode and/or the second two-way communication mode discussed with above with reference to the first embodiment. For example, the LPD can operate in the high responsive state using the subject conditional two-way communication mode 50% of its operation time and the first one-way communication mode 50% of its operation time. In another example, the LPD can operate in the high responsive state using the subject conditional two-way communication mode 50% of its operation time and the first one-way communication mode 40% of its operation time and the second two-way communication mode 10% of its operation time. Still in yet another example, the LPD can operate in the high responsive state using the subject conditional two-way communication mode 25% of its operation time and the first one-way communication mode 70% of its operation time and the second two-way communication mode 5% of its operation time. It should be appreciated that particular communication modes employed by LPD and the degree to which the respective modes are used can vary depending on the device and requirements of the device. The LPD however can be configured to employ communication modes that minimize power consumption without affecting the performance and function of the device.

Figure 4:
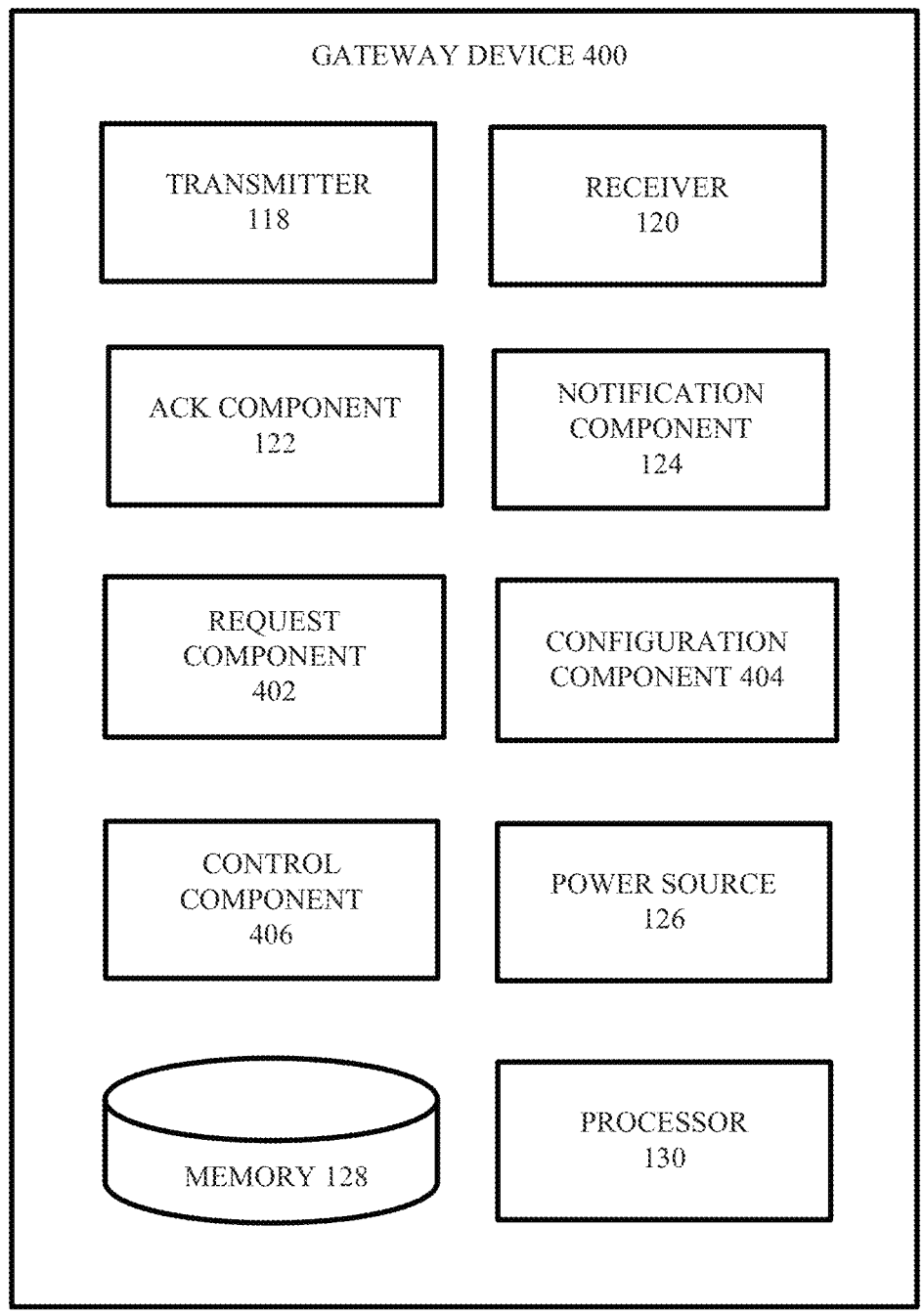
FIG. 4 presents an example gateway device that can be employed in association with a low power sensor network in accordance with various aspects and embodiments described herein.

FIG. 4 presents another example a gateway device 400 that can be employed in association with a low power sensor network in accordance with various aspects and embodiments described herein. Gateway device 400 includes same or similar features and functionalities as gateway device 116 with the addition of request component 402 and configuration component 404. Repetitive description of like elements employed in respective embodiments of systems and devices described herein are omitted for sake of brevity.

Gateway device 400 can include request component 402 to facilitate requesting information from another device, such as a low power sensor device (e.g., LPD 102 or LPD 300) included in a low power sensor network (e.g., network 200). For example, gateway device can request status information or operating statistics from an LPD. Gateway device 400 can also include configuration component 404 to facilitate remote configuration of an LPD by wirelessly sending configuration information to the LPD. For example, configuration component 404 can reconfigure operating modes, and protocols associated with the respective operating modes, of an LPD. In order for requests and reconfiguration information to be received by an LPD, the LPD must be in a receive state with an activated receiver. Thus in an aspect, request component 402 and reconfiguration component can initiate sending of requests and reconfiguration information to an LPD in response to receipt of a message by the gateway device indicating that the LPD is operating in a two-way communication mode.

Gateway device 400 can also include control component 406 to facilitate controlling operating modes of one or more LPDs in a low power sensor network. Control component 406 can monitor performance of communications received from one or more LPDs and determine configuration updates or modifications to communication modes of the one or more LPDs to account for communication issues or errors. In particular, control component 406 can monitor traffic patterns associated with one-way messages received from one or more LPDs when the LPDs are operating using one-way communication modes. Control component can further analyze the traffic patterns on a periodic or continual basis to identify communication errors associated with the traffic patterns. For example, as a low power sensor network grows, collisions between one-way communications of respective devices included in the low power sensor network will also increase.

In an aspect, control component 406 can detect communication errors associated with collisions of one-way messages transmitted by one or more LPDs in a low power sensor network. For example, control component 406 can identify periods of time where one-way messages are not received or received in an irregular fashion with respect to an expected or past pattern of receipt from one or more LPDs included in a low power sensor network.

In response to identifying communication errors based on monitored traffic patterns, control component 406 can determine modifications or updates to operating modes of the one or more LPDs in the low power sensor network that are responsible for or contributing to the communication errors. When determining the modifications or updates, control component 406 can analyze the various operating modes of each of the devices included in the low power sensor network in view of communication errors identified in the monitored traffic patterns and relationships between the respective devices. Based on this analysis, the control component can determine changes to operating modes of one or more of the devices in the low power sensor network that will decrease identified communication errors.

For example, control component 406 can identify one or more devices in the low power sensor network contributing to the communication errors that are operating using a predominately one-way communication mode. The control component 406 can then send configuration update information to those one or more devices that instructs those one or more devices to switch operating using a one-way communication mode to a two-way communication mode. In another example, in order to alleviate communication errors associated with a network that includes a plurality of LPDs communicating with the gateway device 400, control component 406 can increase a portion of time one or more of the plurality of LPDs operates using a two-way communication mode or modify when the LPD uses a two-way communication mode verses a one-way communication mode. For example, control component can modify operating modes of several devices included in a low power sensor network such that the devices alternate times when operating using a one-way communication mode such that fewer devices operated using a one-way communication mode at time. Control component 406 can employ configuration component 404 to transmit determined updates and re-configuration information associated with alleviating communication errors to the one or more devices in the low power sensor network In view of the example systems and/or devices described herein, example methods that can be implemented in accordance with the disclosed subject matter can be further appreciated with reference to flowcharts in FIGS. 5-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 5:
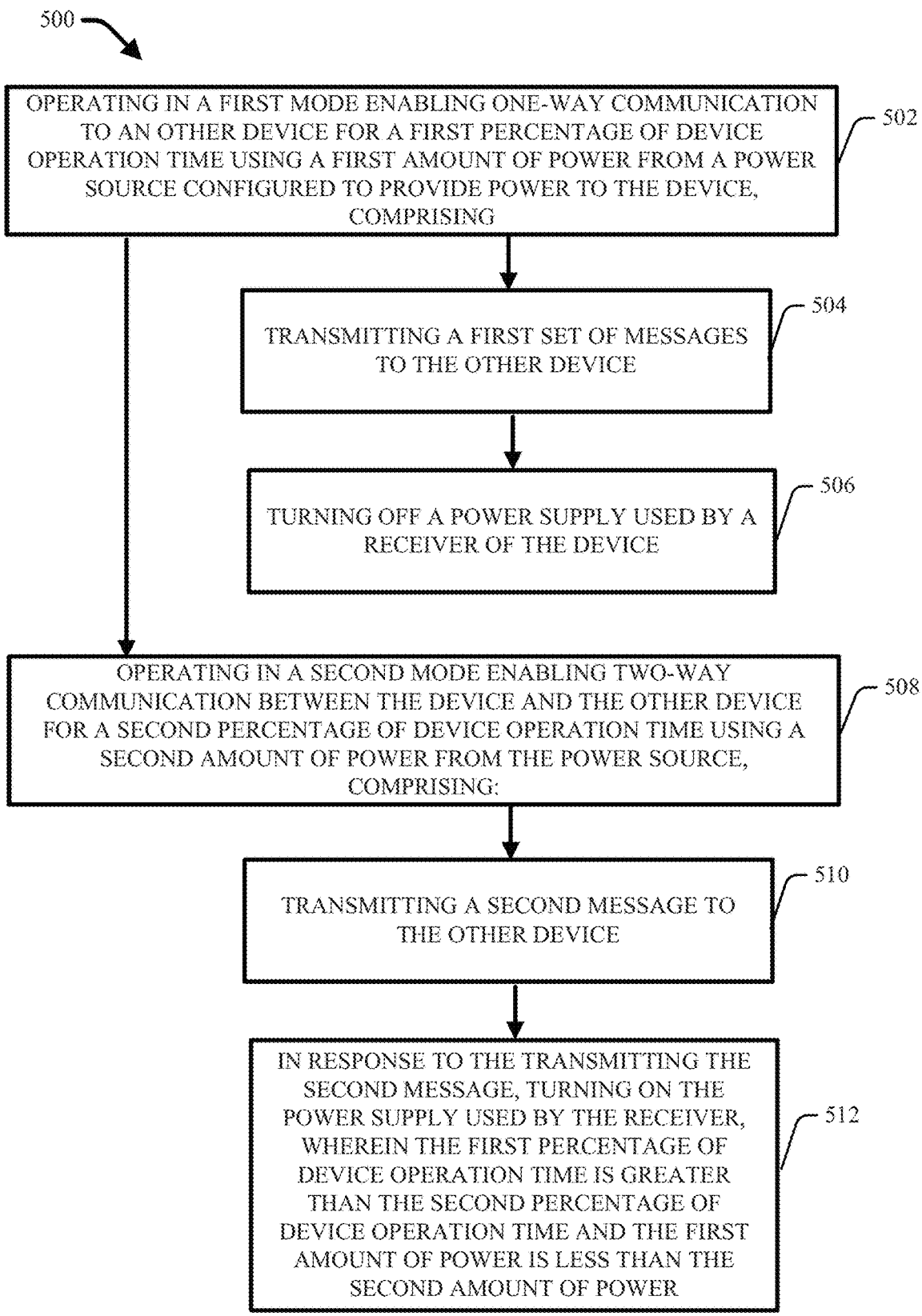
FIG. 5 illustrates an example method for increasing battery life associated with devices employed in a wireless sensor network in accordance with various aspects and embodiments described herein.

FIG. 5 illustrates a flow chart of an example method 500 for communicating in a reduced power consumption mode by a device in accordance with aspects described herein. At 502 a device comprising a processor operates in a first mode enabling one-way communication to another device for a first percentage of device operation time using a first amount of power from a power source configured to provide power to the device. In association with the first mode, at 504, the device transmits a first set of messages to the other device, and at 506, the device turns off power supply used by a receiver of the device. At 508, the device operates in a second mode enabling two-way communication between the device and the other device for a second percentage of device operation time using a second amount of power from the power source. In association with the second mode, at 510 the device transmits a second message to the other device. At 512, in response to the transmitting the second message, the device turns on the power supply used by the receiver. In accordance with method 500, the first percentage of device operation time is greater than the second percentage of device operation time and the first amount of power is less than the second amount of power.

Figure 6:
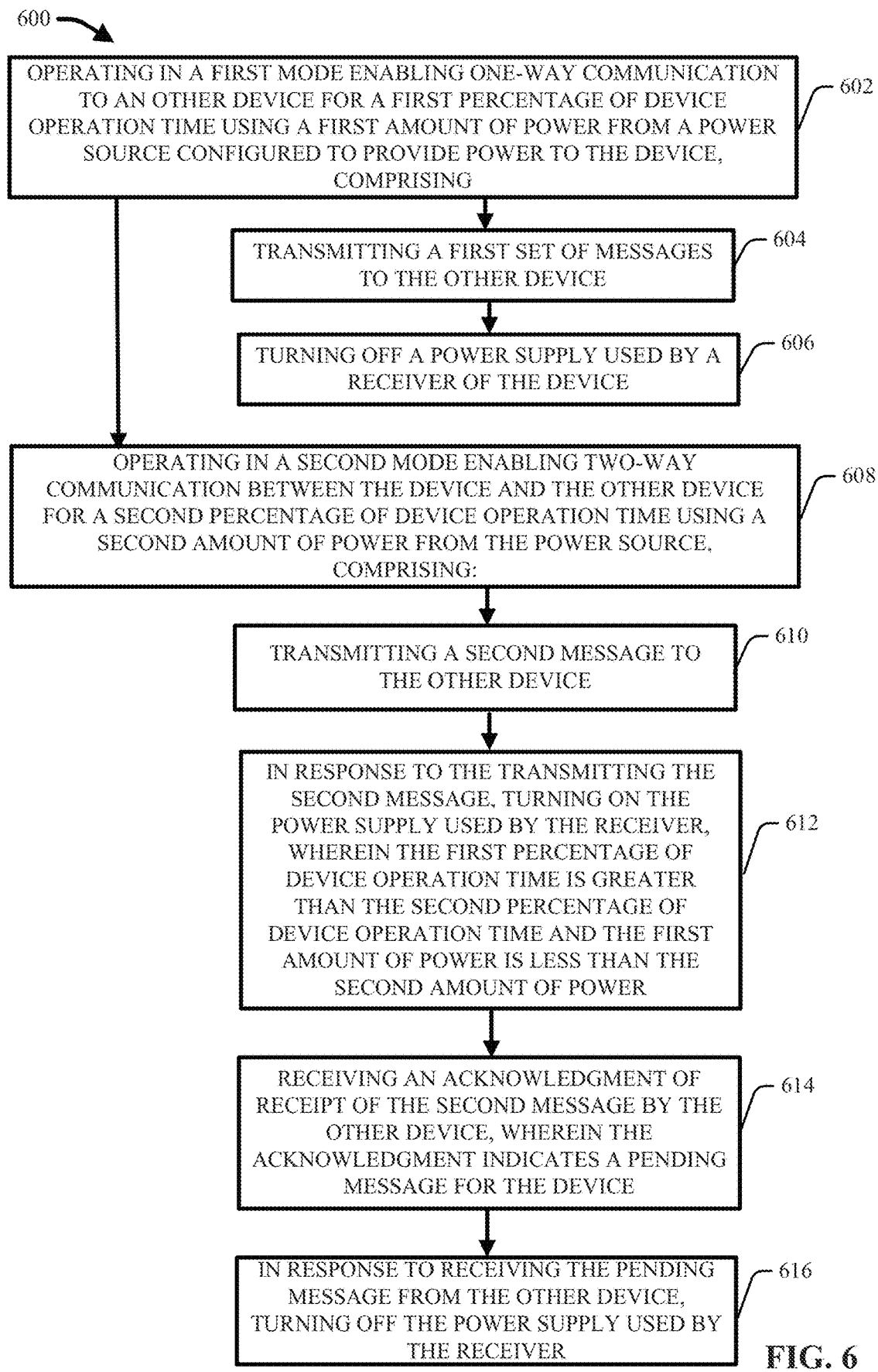
FIG. 6 illustrates another example method for increasing battery life associated with devices employed in a wireless sensor network in accordance with various aspects and embodiments described herein.

FIG. 6 illustrates a flow chart of another example method 600 for communicating in a reduced power consumption mode by a device in accordance with aspects described herein. At 602 a device comprising a processor operates in a first mode enabling one-way communication to another device for a first percentage of device operation time using a first amount of power from a power source configured to provide power to the device. In association with the first mode, at 604, the device transmits a first set of messages to the other device, and at 606, the device turns off power supply used by a receiver of the device. At 608, the device operates in a second mode enabling two-way communication between the device and the other device for a second percentage of device operation time using a second amount of power from the power source. In association with the second mode, at 610 the device transmits a second message to the other device. At 612, in response to the transmitting the second message, the device turns on the power supply used by the receiver. At 614, an ACK is received regarding receipt of the second message by a receiving device. The ACK can indicate a pending message for the device from the receiving device. At 616, in response to receiving the ACK, the device turns off the power supply used by the receiver. In accordance with method 600, the first percentage of device operation time is greater than the second percentage of device operation time and the first amount of power is less than the second amount of power.

Figure 7:
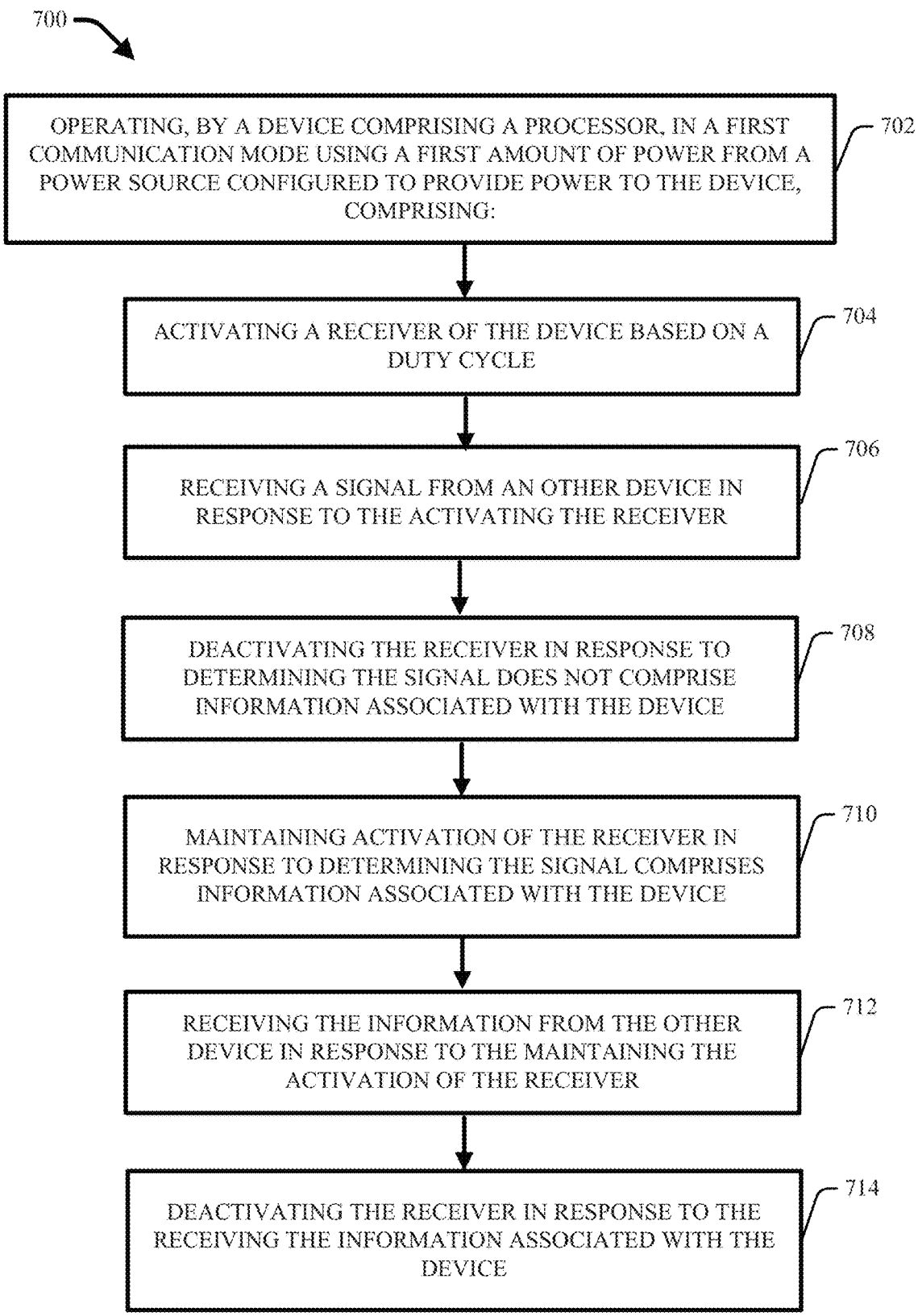
FIG. 7 illustrates another example method for increasing battery life associated with devices employed in a wireless sensor network in accordance with various aspects and embodiments described herein.

FIG. 7 illustrates a flow chart of another example method 700 for communicating in a reduced power consumption mode by a device in accordance with aspects described herein. At 702, a device comprising a processor operates in a first communication mode (e.g., a conditional two-way communication mode associated with a high responsive device state) using a first amount of power from a power source configured to provide power to the device. In association with operating in the first communication mode, at 704 a receiver of the device is activated based on a duty cycle (e.g., every 200 ms per every 60 seconds). At 706, a signal is received from another device in response to the activating the receiver. At 708, the receiver is deactivated in response to determining the signal does not comprise information associated with the device. At 710, activation of the receiver is maintained in response to determining the signal comprises information associated with the device. At 712 the information from the other device is received in response to the maintaining the activation of the receiver. At 714, the receiver is deactivated in response to the receiving the information associated with the device.

Figure 8:
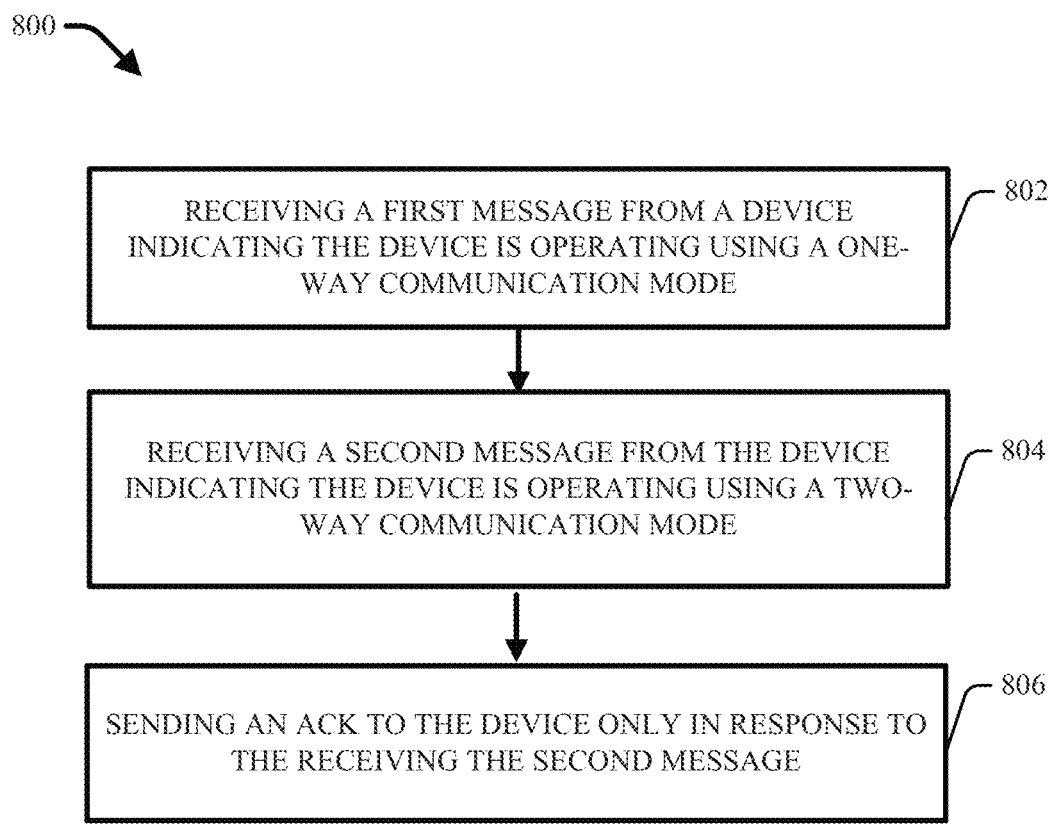
FIG. 8 illustrates another example method for increasing battery life associated with devices employed in a wireless sensor network in accordance with various aspects and embodiments described herein.

FIG. 8 illustrates a flow chart of an example method 800 for facilitating communicating in a reduced power consumption mode by one or more device included in a local network in accordance with aspects described herein. At 802, a first message is received from a device indicating the device is operating using a one-way communication mode. At 804, a second messaged is received from the device indicating the device is operating in a two-way communication mode. Then at 806, an ACK is sent to the device only in response to the receiving the second message.

Figure 9:
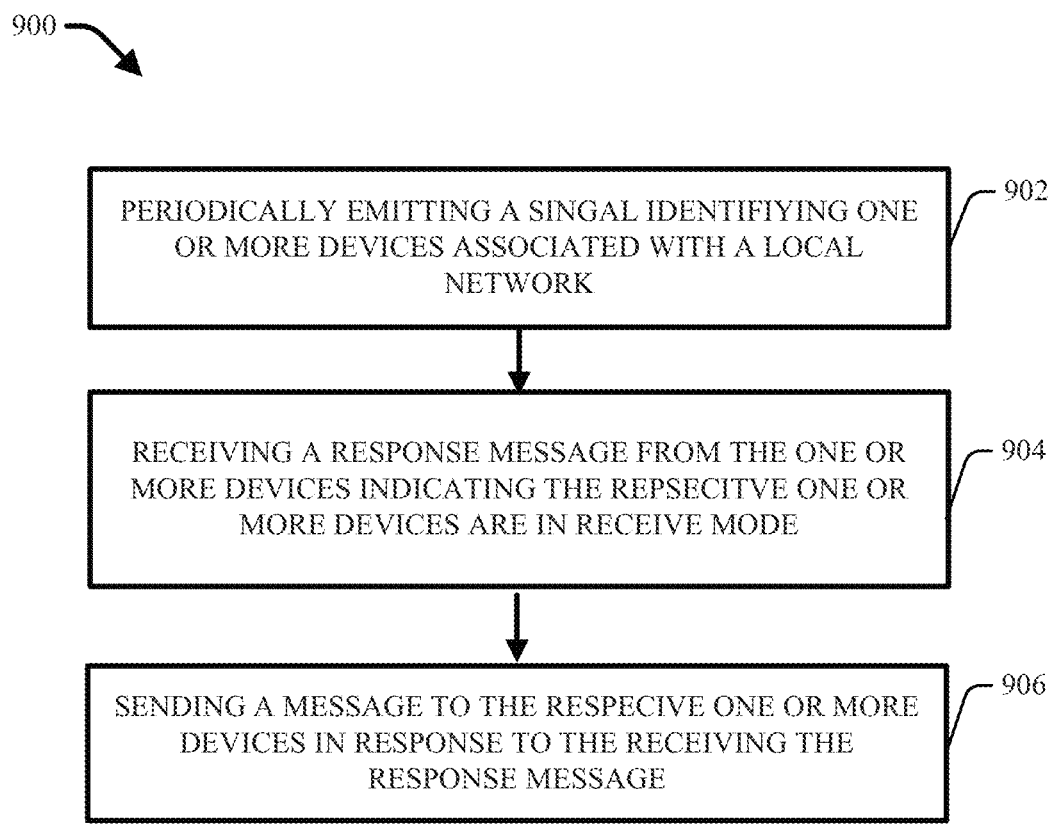
FIG. 9 illustrates another example method for increasing battery life associated with devices employed in a wireless sensor network in accordance with various aspects and embodiments described herein.

FIG. 9 illustrates a flow chart of another example method 900 for facilitating communicating in a reduced power consumption mode by one or more device included in a local network in accordance with aspects described herein. At 902, a device comprising a processor (e.g., gateway device 116 or 400), periodically emits a signal identifying one or more devices associated with a local network. At 902, a response is received from the one or more devices indicating the respective one or more devices are in receive mode. At 906, a message is send to the respective one or more devices in response to the receiving the response message.

Figure 10:
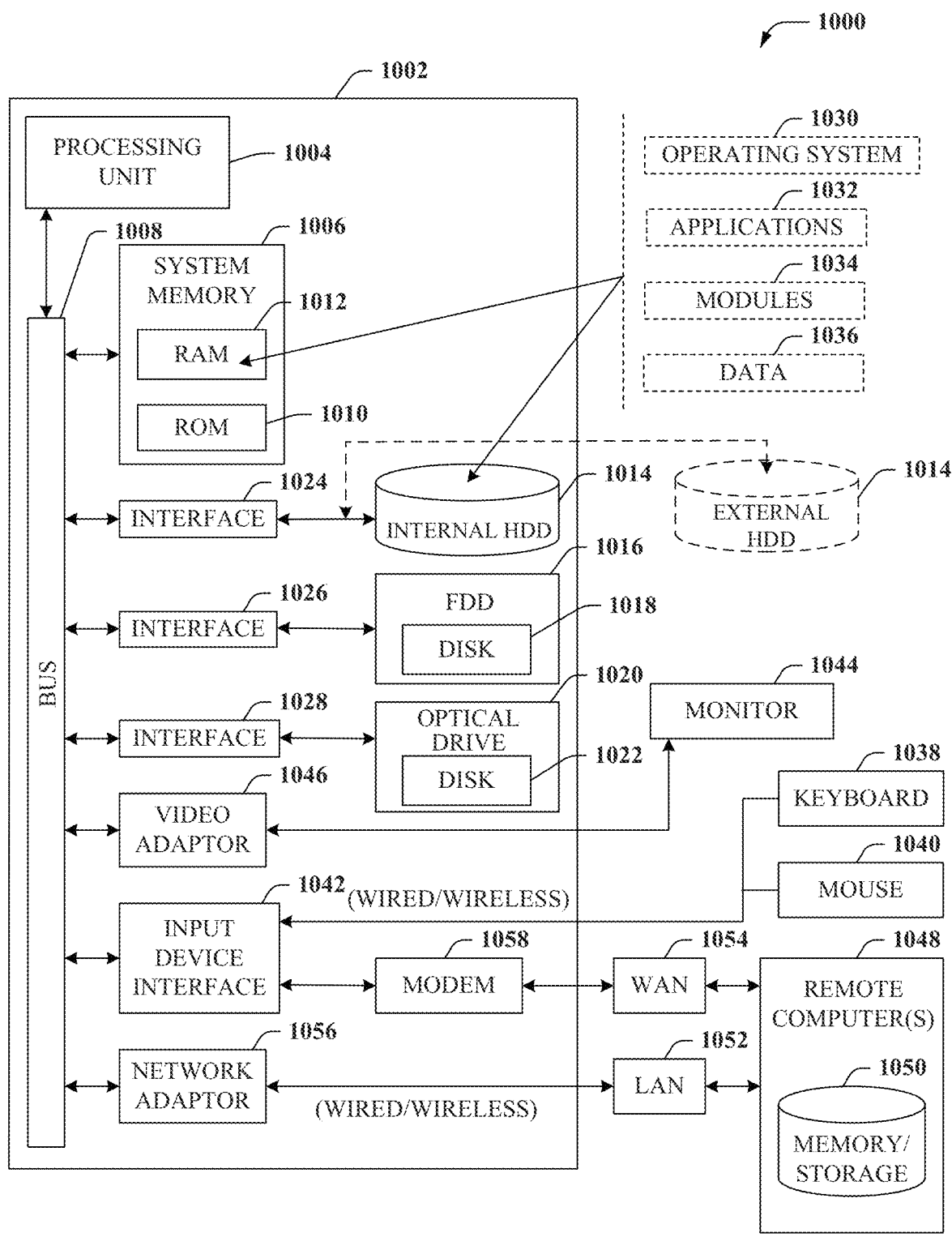
FIG. 10 is a schematic block diagram illustrating a suitable operating environment in accordance with various aspects and embodiments.
Figure 11:
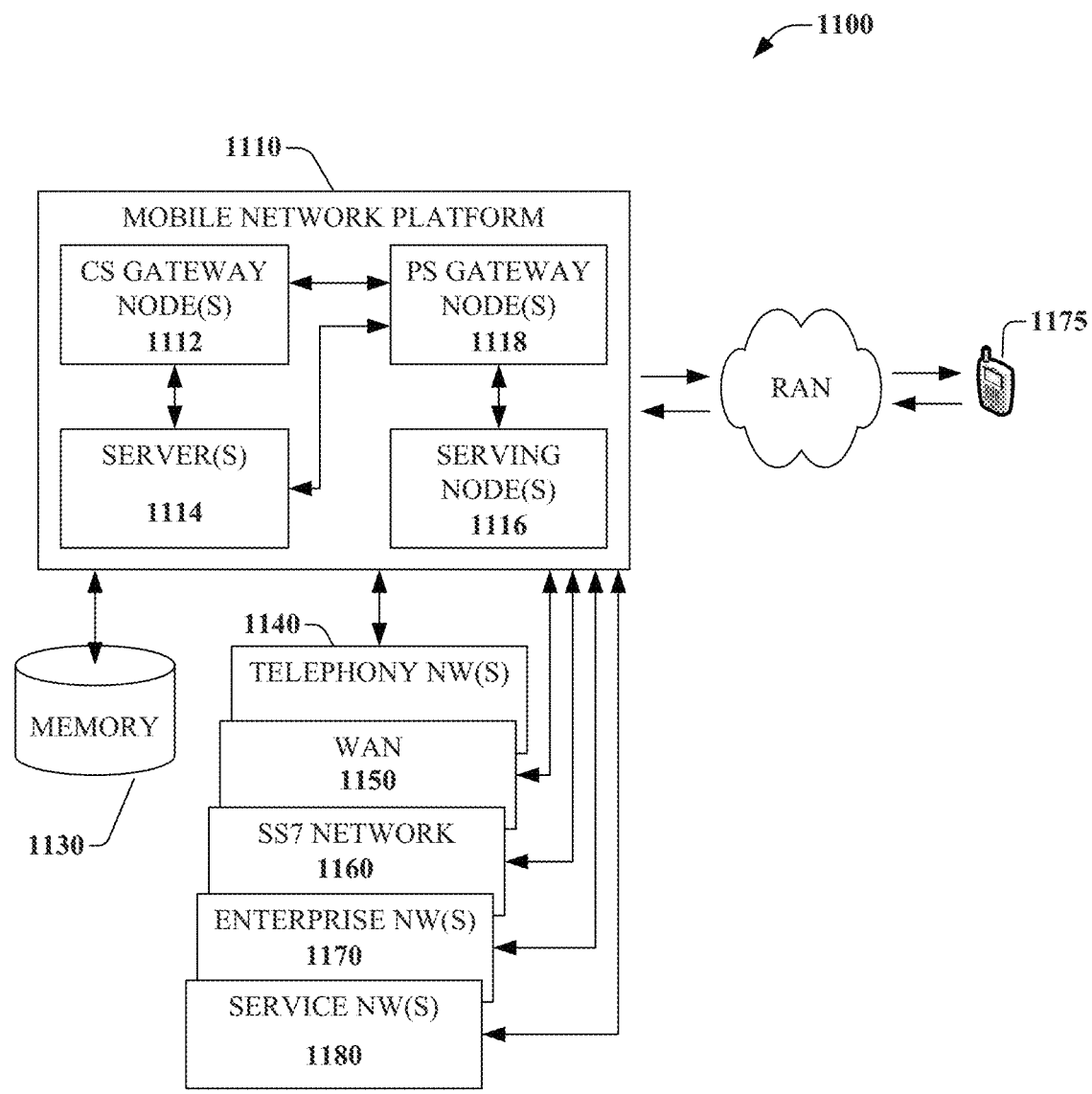
FIG. 11 is a schematic block diagram of a sample-computing environment in accordance with various aspects and embodiments.

The subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that performs particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., smartphone, PDA, electronic tablets or pads, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Referring now to FIG. 10, there is illustrated a block diagram of a computing environment in accordance with various aspects described herein. For example, in some embodiments, the computer can be or be included within the distributed antenna system disclosed in any of the previous systems 100 and 400.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and Institute of Electrical and Electronics Engineers (IEEE) 10104 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 13104 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless AP disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

FIG. 11 presents an example embodiment 1100 of a mobile network platform 1110 that can implement and exploit one or more aspects of the disclosed subject matter described herein. Generally, wireless network platform 1110 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1110 can be included in telecommunications carrier networks, and can be considered carrier-side components as discussed elsewhere herein. Mobile network platform 1110 includes CS gateway node(s) 1112 which can interface CS traffic received from legacy networks like telephony network(s) 1140 (e.g., public switched telephone network (PSTN), or public land mobile network (PLMN)) or a signaling system #7 (SS7) network 1170. Circuit switched gateway node(s) 1112 can authorize and authenticate traffic (e.g., voice) arising from such networks. Additionally, CS gateway node(s) 1112 can access mobility, or roaming, data generated through SS7 network 1170; for instance, mobility data stored in a visited location register (VLR), which can reside in memory 1130. Moreover, CS gateway node(s) 1112 interfaces CS-based traffic and signaling and PS gateway node(s) 1118. As an example, in a 3GPP UMTS network, CS gateway node(s) 1112 can be realized at least in part in gateway GPRS support node(s) (GGSN). It should be appreciated that functionality and specific operation of CS gateway node(s) 1112, PS gateway node(s) 1118, and serving node(s) 1116, is provided and dictated by radio technology(ies) utilized by mobile network platform 1110 for telecommunication.

In addition to receiving and processing CS-switched traffic and signaling, PS gateway node(s) 1118 can authorize and authenticate PS-based data sessions with served mobile devices. Data sessions can include traffic, or content(s), exchanged with networks external to the wireless network platform 1110, like wide area network(s) (WANs) 1150, enterprise network(s) 1170, and service network(s) 1180, which can be embodied in local area network(s) (LANs), can also be interfaced with mobile network platform 1110 through PS gateway node(s) 1118. It is to be noted that WANs 1150 and enterprise network(s) 1160 can embody, at least in part, a service network(s) like IP multimedia subsystem (IMS). Based on radio technology layer(s) available in technology resource(s) 1117, packet-switched gateway node(s) 1118 can generate packet data protocol contexts when a data session is established; other data structures that facilitate routing of packetized data also can be generated. To that end, in an aspect, PS gateway node(s) 1118 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1100, wireless network platform 1110 also includes serving node(s) 1116 that, based upon available radio technology layer(s) within technology resource(s) 1117, convey the various packetized flows of data streams received through PS gateway node(s) 1118. It is to be noted that for technology resource(s) 1117 that rely primarily on CS communication, server node(s) can deliver traffic without reliance on PS gateway node(s) 1118; for example, server node(s) can embody at least in part a mobile switching center. As an example, in a 3GPP UMTS network, serving node(s) 1116 can be embodied in serving GPRS support node(s) (SGSN).

For radio technologies that exploit packetized communication, server(s) 1114 in wireless network platform 1110 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1110. Data streams (e.g., content(s) that are part of a voice call or data session) can be conveyed to PS gateway node(s) 1118 for authorization/authentication and initiation of a data session, and to serving node(s) 1116 for communication thereafter. In addition to application server, server(s) 1114 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1110 to ensure network's operation and data integrity in addition to authorization and authentication procedures that CS gateway node(s) 1112 and PS gateway node(s) 1118 can enact. Moreover, provisioning server(s) can provision services from external network(s) like networks operated by a disparate service provider; for instance, WAN 1150 or Global Positioning System (GPS) network(s) (not shown). Provisioning server(s) can also provision coverage through networks associated to wireless network platform 1110 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1175.

It is to be noted that server(s) 1114 can include one or more processors configured to confer at least in part the functionality of macro network platform 1110. To that end, the one or more processor can execute code instructions stored in memory 1130, for example. It is should be appreciated that server(s) 1114 can include a content manager 1115, which operates in substantially the same manner as described hereinbefore.

In example embodiment 1100, memory 1130 can store information related to operation of wireless network platform 1110. Other operational information can include provisioning information of mobile devices served through wireless platform network 1110, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1130 can also store information from at least one of telephony network(s) 1140, WAN 1150, enterprise network(s) 1160, or SS7 network 1170. In an aspect, memory 1130 can be, for example, accessed as part of a data store component or as a remotely connected memory store.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1120 (see below), non-volatile memory 1122 (see below), disk storage 1124 (see below), and memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device, comprising:
   a processor, and
   a memory that stores executable instructions that, when executed by the processor, facilitate performance of operations, comprising:
   alternating between operating using at least three different communication modes to wirelessly communicate with a gateway device of a sensor network, wherein the at least three different communication modes comprise:
   a first communication mode that comprises deactivating a receiver of the device in connection with activating a transmitter of the device to transmit a first data packet to the gateway device,
   a second communication mode that comprises activating the receiver in connection with transmitting a second data packet to the gateway device, and deactivating the receiver based on receiving an acknowledgment message from the gateway device, and
   a third communication mode that comprises periodically activating the receiver and performing a two-way communication with the gateway device based on receiving a notification from the gateway device in connection with the periodically activating the receiver; and controlling when the device uses respective communication modes of the at least three different communication modes based on schedule information stored in the memory that defines when the device is to operate using the respective communication modes.

2. The device of claim 1, wherein the deactivating the receiver comprises deactivating the receiver after passage of a defined period of time after the receiving the acknowledgment message based on information included in the acknowledgment message that instructs the device to maintain activation of the receiver for the defined period of time.

3. The device of claim 1, wherein the schedule information identifies a single point in time over a twenty four hour period when the device is to operate using the second communication mode.

4. The device of claim 1, wherein the first communication mode is associated with 90% less of the power consumption relative to the second communication mode.

5. The device of claim 1, wherein the at least three different communication modes further comprise a fourth communication mode that comprises:
transmitting a fourth data packet to the gateway device comprising information about the device, and
receiving configuration information from the gateway device defining configuration parameters for the first communication mode, the second communication mode or the third communication mode.

6. The device of claim 5, wherein the operations further comprise:
employing the configuration parameters in association with the alternating between the operating using the at least three different communication modes.

7. The device of claim 1, wherein the alternating between the operating using the at least three different communication modes comprises transmitting different data packets to the gateway device comprising information identifying which mode of the at least three different communication modes the device is using.

8. The device of claim 1, wherein the device comprises a first sensor device and wherein the sensor network comprises the gateway device and a plurality of sensor devices, including the first sensor device.

9. A method, comprising:
switching between operating, by a device comprising a processor, in respective communication modes of three different communication modes to wirelessly communicate with a gateway device of a sensor network, wherein the three different communication modes comprise:
a first communication mode that comprises deactivating a receiver of the device in connection with activating a transmitter of the device to transmit a first data packet to the gateway device,
a second communication mode that comprises activating the receiver in connection with transmitting a second data packet to the gateway device, and deactivating the receiver based on receiving an acknowledgment message from the gateway device, and
a third communication mode that comprises periodically activating the receiver and performing a two-way communication with the gateway device based on receiving a notification from the gateway device in connection with the periodically activating the receiver; and controlling, by the device, the switching based on schedule information that defines when the device is to operate using the respective communication modes.

10. The method of claim 9, wherein the deactivating the receiver comprises deactivating the receiver after passage of a defined period of time after the receiving the acknowledgment message based on information included in the acknowledgment message that instructs the device to maintain activation of the receiver for the defined period of time.

11. The method of claim 9, wherein the schedule information identifies a point in time over a twenty four hour period when the device is to switch to the operating in the second communication mode.

12. The method of claim 9, wherein the first communication mode is associated with 90% less of the power consumption relative to the second communication mode.

13. The method of claim 9, wherein the three different communication modes further comprise a fourth communication mode, and wherein the fourth communication mode comprises:
transmitting a fourth data packet to the gateway device comprising information about the device, and
receiving configuration information from the gateway device defining a configuration parameter for the first communication mode, the second communication mode or the third communication mode.

14. The method of claim 13, further comprising:
employing the configuration parameter in association with the switching between the operating using the respective communication modes.

15. A non-transitory machine-readable storage medium, comprising executable instructions that, when executed by a processor of a device, facilitate performance of operations, comprising:
alternating between operating using at least three different communication modes to wirelessly communicate with a gateway device of a sensor network, wherein the at least three different communication modes comprise:
a first communication mode that comprises deactivating a receiver of the device in connection with activating a transmitter of the device to transmit a first data packet to the gateway device,
a second communication mode that comprises activating the receiver in connection with transmitting a second data packet to the gateway device, and deactivating the receiver based on receiving an acknowledgment message from the gateway device, and
a third communication mode that comprises periodically activating the receiver and performing a two-way communication with the gateway device based on receiving a notification from the gateway device in connection with the periodically activating the receiver; and
controlling when the device uses respective communication modes of the at least three different communication modes based on schedule information that defines when the device is to operate using the respective communication modes.

16. The non-transitory machine-readable storage medium of claim 15, wherein the at least three different communication modes are respectively characterized by different amounts of power consumption by the device.

17. The non-transitory machine-readable storage medium of claim 15, wherein the schedule information identifies a point in time over a twenty four hour period when the device is to switch to the operating in the second communication mode.

18. The non-transitory machine-readable storage medium of claim 15, wherein the first communication mode is associated with 90% less of the power consumption relative to the second communication mode.

19. The device of claim 1, wherein the at least three different communication modes are respectively characterized by different amounts of power consumption by the device.

20. The method of claim 9, wherein the three different communication modes are respectively characterized by different amounts of power consumption by the device.

* * * * *